United States Patent [19]
Bullen

[11] Patent Number: 6,033,226
[45] Date of Patent: Mar. 7, 2000

[54] MACHINING TOOL OPERATOR TRAINING SYSTEM

[75] Inventor: George Nicholas Bullen, Oxnard, Calif.

[73] Assignee: Northrop Grumman Corporation, Los Angeles, Calif.

[21] Appl. No.: 08/858,037

[22] Filed: May 15, 1997

[51] Int. Cl.[7] .................................................. G09B 19/00
[52] U.S. Cl. ...................................... 434/219; 434/307 R
[58] Field of Search ................................... 434/219, 224, 434/227, 307 R, 322, 323, 234, 362, 365, 308

[56] References Cited

U.S. PATENT DOCUMENTS

| | | | |
|---|---|---|---|
| 4,224,744 | 9/1980 | Siegel et al. | 434/234 |
| 4,812,125 | 3/1989 | Strashun | 434/224 |
| 4,867,685 | 9/1989 | Brush et al. | 434/234 |
| 4,899,292 | 2/1990 | Montagna et al. | |
| 4,931,018 | 6/1990 | Herbst et al. | 434/219 |
| 5,111,402 | 5/1992 | Brooks et al. | |
| 5,174,759 | 12/1992 | Preston et al. | |
| 5,286,202 | 2/1994 | de Gyarfas et al. | |
| 5,320,538 | 6/1994 | Baum | 434/234 |
| 5,442,549 | 8/1995 | Larson . | |
| 5,442,759 | 8/1995 | Chiang et al. | |
| 5,454,722 | 10/1995 | Holland et al. | |
| 5,572,726 | 11/1996 | Hasuo . | |
| 5,615,384 | 3/1997 | Allard et al. | |
| 5,724,262 | 3/1998 | Ghahramani | 434/322 |
| 5,803,738 | 9/1998 | Latham | 434/307 R |
| 5,882,202 | 3/1999 | Sameth et al. | 434/157 |

*Primary Examiner*—Valencia Martin-Wallace
*Assistant Examiner*—John Paradiso
*Attorney, Agent, or Firm*—Terry J. Anderson; Karl J. Hoch, Jr.

[57] ABSTRACT

The present invention is a an interactive multi-media training system which incorporates text, audio, and video graphics animation and other tools to teach an operator to use a machining or other tool. The training system includes a computer workstation to allow inputs from an operator, computer memory, and a training computer program operating on the computer and having a graphical user interface for interfacing the operator with the workstation and interactively training the operator to operate and perform tasks on the machine tool. The operator can provide inputs to the training system by various input devices such as a keyboard, cursor or mouse. The training system additionally includes interface software operating on the computer for controlling the machine tool and sharing access to and exchange data with the computer memory and a remote station linked to the computer memory for allowing an instructor to monitor and supervise the operator in real time.

29 Claims, 10 Drawing Sheets

MACHINING TOOL OPERATOR TRAINING SYSTEM

BACKGROUND OF THE INVENTION

1. Field of the Invention

This invention relates to interactive, computer-based training systems. More particularly, this invention relates to a multi-media application software operating on a computer comprised of text, audio, video and computer graphics animation for teaching an operator how to use a device, such as a machining or other tool in an environment outside the computer.

2. Related Art

The devices available to train a person, such as a tool operator, have in the past incorporated various options. Primarily, however, most operator training has been conducted by theoretical training in a classroom setting, or practical training whereby the operator is trained by using the actual tool in question to manufacture the desired work piece.

Both theoretical and practical training of the type cited above have serious disadvantages. Theoretical training, although providing an overview of the steps and concepts employed in the tooling operation, does little to provide the operator with any manual skill, such as dexterity or steadiness of hand, which may be required in the tooling operation. Many years of actual physical practice are often necessary to develop the skill and knowledge necessary to machine a part. This is particularly true if the machined part or process used to machine it is complex. Additionally, theoretical training does little to build the confidence of an operator in being able to manufacture the work piece on their own. Another drawback with theoretical training in a classroom setting is that it may be ineffective for the student to listen to lectures and read a book without being able to apply what is learned or to assess their knowledge during the course of such training.

Practical, hands on training, on the other hand, allows an operator to develop the skill and understanding necessary to effectively operate the tool to machine a work piece. However, a draw back with standard practical training is that although it provides the operator with experience to build the part or conduct the process in question, any mistakes made in this process may be costly. Valuable time and material is then required to correct such mistakes.

Hence, a training tool is needed that allows the operator to gain both theoretical and practical knowledge and skill while avoiding costly mistakes. This training tool should maintain the interest of the student and allow them to self-assess their knowledge and skill during the progression of training. It should provide for many techniques and aids to allow the student to most effectively gain and retain the information provided.

SUMMARY OF THE INVENTION

To overcome the limitations in the prior art described above, and to overcome other limitations that will become apparent upon reading and understanding the present specification, the present invention is an interactive multimedia training system which incorporates text, audio, and video graphics animation and other tools to teach a user (in the description that follows, the term user is used interchangeably with the term operator) to use a device in an outside environment, such as a machining or other tool without the drawbacks of traditional practical training.

The training system includes a computer workstation to allow inputs from a user, such as a machine operator trainee, computer memory, and a training computer program operating on the computer and having a graphical user interface for interfacing the operator with the workstation and interactively training the operator to operate and perform tasks on the machine tool. The operator can provide inputs to the training system by various input devices such as a keyboard, cursor or mouse.

In addition, the training system can include interface software operating on the computer for controlling the machine tool. The interface software can share access to and exchange of data with the computer memory. Also, the training system can further include a remote station linked to the computer memory of the interactive computer. The remote station can have an instructor for monitoring and supervising the operator in real time. Moreover, the remote station can share access to and exchange data with the computer memory.

The graphical user interface includes a Main Menu area which allows the user to select a specific training category, such as a tooling category associated with the actual machining operation of a specific part for that tooling category. Once the Tooling Category for a specific part has been selected, a Tooling Operation Submenu appears on the display which allows the operator to select a Tooling Operation for which he or she desires training. Various functions, such as an example of machining the part, practice for machining the part, simulation of machining the part, a diagram of the part, expert advice on machining the part, a walk through of the machining function and a self-test function, are also included for each tooling operation for each part. These functions are accessible via the graphical user interface.

The training system has many advantages. It serves as a quick reference guide. In addition to the computer-based training mode, the training system may be, but does not have to be, interfaced with an actual tool to allow the user to simulate the function that will be carried out. Additionally, the training system serves as a self testing device. That is, the training system allows the operator to test themselves on the task to be performed. Also, the training system serves as a quality control vehicle to ensure the operator learns how to manufacture the work piece effectively before actually making one. It gives the user the ability to access different instructional media. This application will increase the operator's mnemonic capacities and will insure the product is built correctly.

The foregoing and still further features and advantages of the present invention as well as a more complete understanding there of will be made apparent from a study of the following detailed description of the invention with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiments of the present invention, reference is made to the accompanying drawings which are a part hereof, and which is shown by way of illustration specific embodiments in which the invention may be practiced. It is understood that other embodiments may be utilized and structural changes may be made without departing from the scope of the present invention.

Overview

Figure 1A:
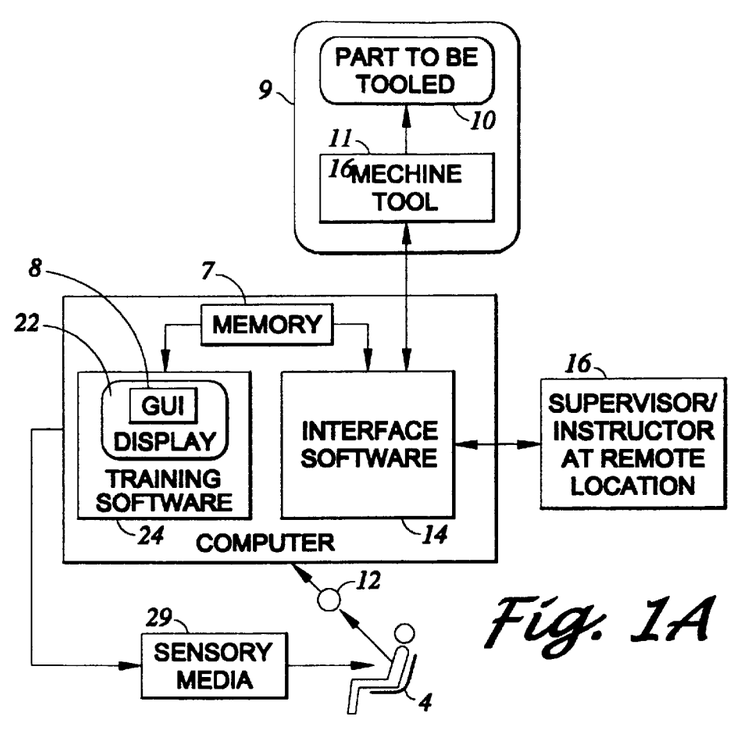
FIG. 1A is an overall block diagram of the present invention.

FIG. 1A is an overall block diagram of the present invention. The present invention is a training system 2 for providing a user 4, such as an operator, with an interactive computer environment 6 with a memory medium 7 and training software 8 operating on the computer 6. The training software 8 has access to and exchanges data with the memory medium 7. The training system 2 trains the operator 4 to perform specific tasks in an environment 9 outside of the computer 6. For example, the training system 2 can teach the operator 4 to machine a part or workpiece 10 with a machine tool 11 by responding to inputs 12 by the operator 4. The input can be stored in the computer memory 7.

The training system 2 can also have, but does not have to have, interface software 14 interfaced to an actual machine tool 11 of an outside situation or environment 9 for direct response and control of the environment 9. The interface software 14 operates on the computer 6 for controlling the machine tool 11. The interface software 14 can share access to and exchange of data with the memory medium 7.

Also, the training system 2 can further include a remote station 16 linked to the computer memory 7 of the interactive computer 6. The remote station 16 can have an instructor for monitoring and supervising the operator 4 in real time. Moreover, the remote station 16 can share access to and exchange data with the computer memory 7. The remote station 16 can be linked to the computer 6 in any suitable networking manner, such as via an intranet or internet connection.

Figure 1B:
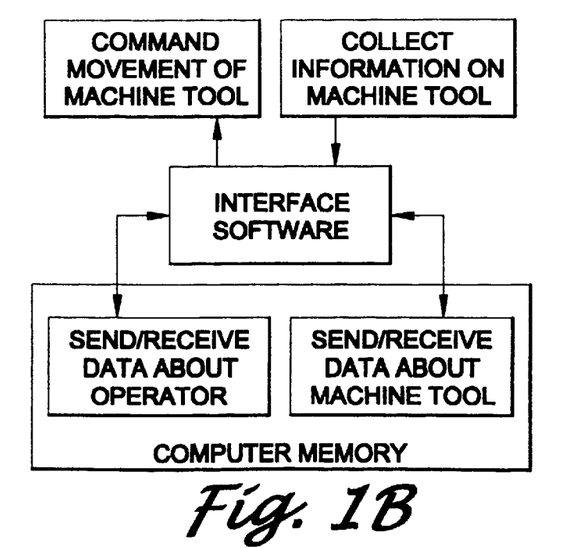
FIG. 1B is a block diagram of the operation of the interface software with the machine tool.

FIG. 1B is a block diagram of the operation of the interface software with the machine tool. The interface software 14 receives data from the computer memory 7. This data can include preprogrammed commands and instructions for operating the machine tool 11 and/or history profiles of the operator's input to the training software 8. The interface software 14 also receives instantaneous data from the machine tool 11 indicating the tool's 11 position, location, status, etc. The interface software 14 processes the data from the computer memory 7 and the machine tool 11 and sends suitable commands to the machine tool 11 for operating the machine tool 11 in real time.

The computer 6 of the training system 2 is preferably a workstation, such as a windows-based personal computer or a UNIX computer workstation. The workstation 6 includes a primary display 22 which incorporates a graphical user interface 24 of the training software 8. This graphical user interface 24 varies depending on operator input. The training software 8 is an event driven program. Since the training system is event driven, the graphical user interface 24 constantly calls functions and sends messages to the software 8 to indicate that some event has occurred. This allows the training software 8 to directly respond to data and input from the operator 4. The events can include cursor movement, keystrokes, or mouse movements from the operator 4. Also, the training software 8 includes sensory media 29 associated with actual trainable machine tooling events for interactively training the operator 4.

Figure 2:
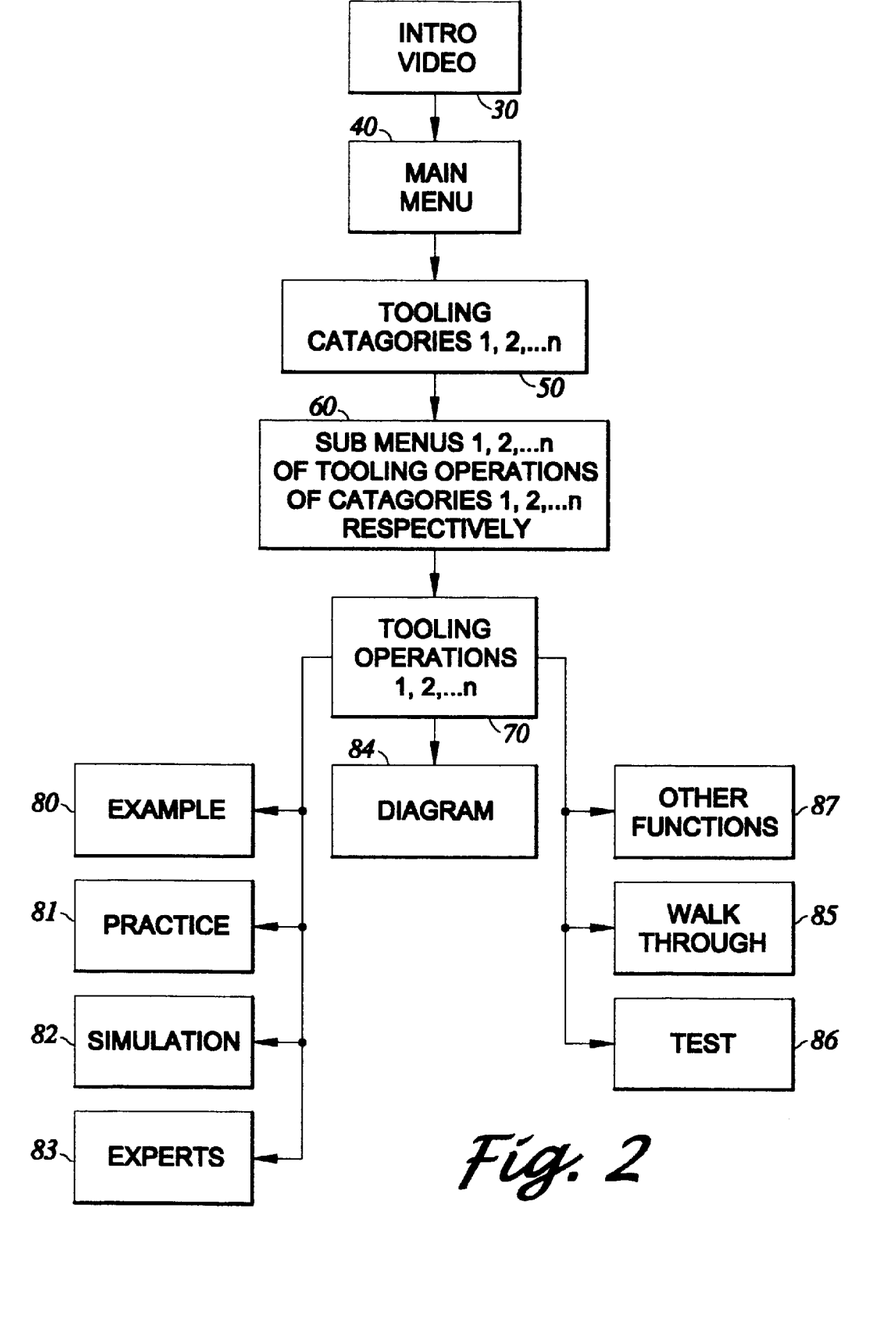
FIG. 2 is an overall illustration showing a general flow chart of the training system of the present invention.
Figure 3:
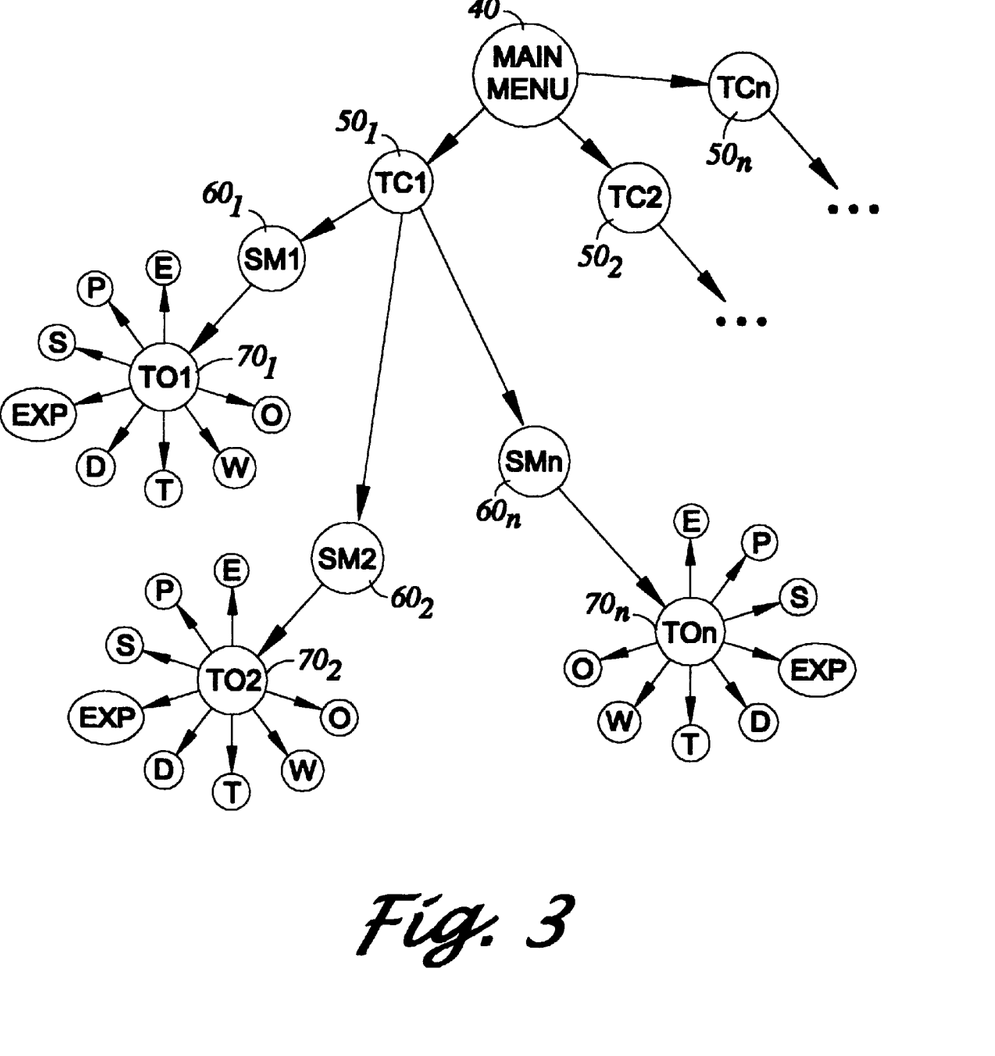
FIG. 3 provides a more detailed overview chart of the modules accessible from the Main Menu of the present invention.

Referring to FIG. 2 along with FIG. 1A, FIG. 2 is a general flow diagram of the training software 8 operating on the workstation 6. FIG. 3 provides a more detailed depiction of the information available from the Main Menu 40. As shown in FIG. 2, the training software 8 commences with an Introductory Video 30 and then the Main Menu 40 appears. From the Main Menu 40 various tooling categories TC1 through TCn can be selected by the operator via a tooling category sub-menu 50. Once a tooling category Tcn has been selected a Tooling Operation Submenu 60 appears. This Tooling Operation Submenu 60 allows the operator to select Tooling Operations TO1 through Ton within the particular tooling category.

The operator can select for which tooling operation he or she would like to be trained. Once a tooling operation has been selected, various functions become available to the operator/user with respect to that particular tooling operation. These can include for instance, an example of a tooling operation 80, practice of a tooling operation 81, simulation of a tooling operation 82, expert advice on a tooling operation 83, diagrams 84 of the machined part and tooling steps, a self-test 86 of a particular tooling function, a walkthrough of a particular tooling operation 85 and other functions 87 suitable to interactively train an operator 4.

The graphical user interface 24 includes screen objects to provide event driven functionality for the training software 8. The objects include menu control buttons, integrated windows or viewer areas and icons that allow the operator 4, such as a machine tool operator, to view and select various items as will be discussed more specifically with respect to the specific graphical user interface displays available within the software.

Components

In general, the training system software 8 employs various program components and variables that allow the operator 4 to navigate through the training software 8 and enhance the training utility of the software. These are described more specifically below.

Program Components

The interface can be navigated with and controlled by various functions, such as a Quit function, which allows the user to quit the program; a Pause function which allows the user to pause the program; and a forward/backward function which allows the user to move forward or backward through the program. Additionally, the program has a page forward/page backward function which allows the user to move through different sections of the program. The training software also includes a Notepad function throughout, which allows the user to save notes. There is also a print function which allows the user to print out screens and an index function that allows the user to see, at a glance what is included in the program. These program components used for interface control can be programmed keyboard functions or functional screen buttons.

Subject Variables

The application software employs sensory media 29 to enhance the training experience. They include but are not limited to audio, text/hyper text, video, graphics, animation, simulations, and self-test capability.

The sensory media 29 of the training set includes audio features in the form of a friendly audio narrative incorporated in the training software. The audio can be selectively turned on and off. Additionally, operator selectable text/hyper text is included in the system. Each screen of instructional material can be accompanied by the text and the operator selectable hypertext. The hypertext allows the user to access additional information associated with the hypertext. Also incorporated in the training system is video. Many processes and tasks have a video segment associated with them so that the user/operator can see a realistic rendition of the information sought to be provided. Additionally, Expert Advice is included.

For instance, the training system can include an index of frequently asked questions. The response to the question can be in the form of a video which includes text/hypertext, animation, and line drawings. High level graphics are incorporated in the training system to enable the user to see in static or dynamic fashion, the task at hand. Users are provided with a close up of the graphic. Additionally, animations show, in a more advanced manner, the task at hand. The animations can be selectively replayed. Video, graphical or animated simulations additionally give the user/operator the opportunity to observe a simulation of the task before actually carrying it out. A self-test capability is also incorporated. With the self-test capability, the user is able to test themselves, both in a practical and theoretical manner. The results of such tests can be saved to a data base for building a history of each operator or trainee and/or for later review by an instructor or supervisor.

Maintenance

Maintenance or operator training can be provided by this training system. For instance, a maintenance training module can provide information on troubleshooting and recommended maintenance activities. The specifics of the present invention will, however, be described in more detail with respect to the operator training available.

Operations

As stated previously, the workstation includes a graphical user interface that divides the workstation display into various windows and objects. Example base display screens of the geographical user interface are discussed below.

Introductory Scene

The training system software opens to an Introductory Scene 30 as shown in FIG. 2. This display (not shown) is divided approximately in half and shows a Heading Window on the left side of the screen and a Graphical Window on the right which may depict an object to be tooled or other device, such as a plane flying over. The Introductory Scene 30 may be accompanied by audio of appropriate sounds, such as the sound of a plane flying over.

Main Menu

Figure 4:
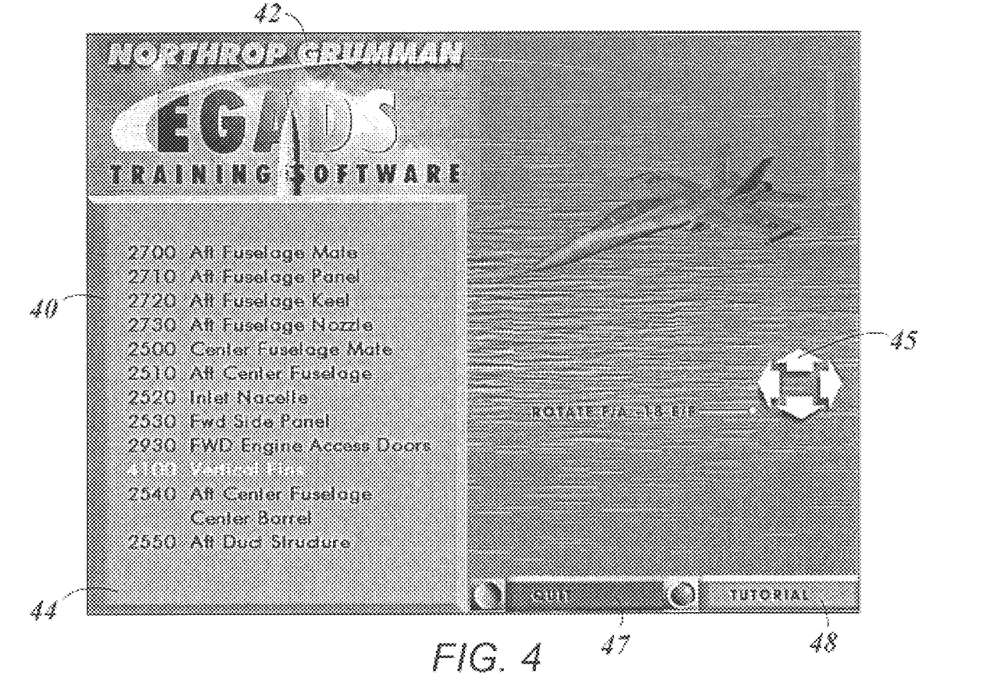
FIG. 4 illustrates the graphical user interface of the Main Menu of the present invention.
Figure 5:
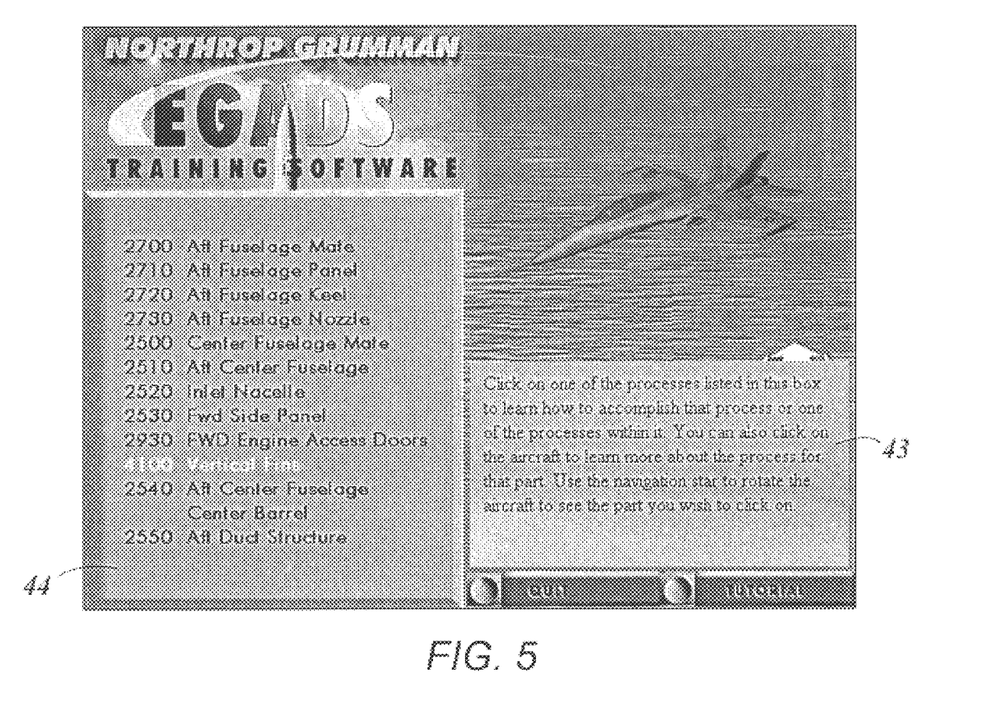
FIG. 5 illustrates an alternate view of the graphical user interface of the Main Menu of the present invention.

Referring the FIGS. 2 and 3 along with FIG. 4, once the initial Introductory Scene 30 appears it automatically turns into the Main Menu 40 for providing access to various training system functions as shown in FIG. 4. This Main Menu 40 includes a Header Window 42 for providing header information, such as the name and version number of the training system or the like; a Text Window 44 for providing a text listing of tool category tasks for which training is available appears; a preferably a help window 43 providing explanatory text to the operator 4 (as shown in FIG. 5), and a Graphical Window 46 for providing animated images representing a device that the operator is being trained on, such as a three dimensional graphical image. A Rotation Icon 45 in the Graphical Window 46 allows the user to rotate the image in three dimensions. The operator can accomplish this by selecting the Rotation Icon 45 in the desired direction of rotation with a cursor controlled by a mouse (not shown).

Additionally, there are two smaller, operator-selectable buttons 47, 48 which allow the operator respectively to either quit the training software or enter the training tutorial by pointing and clicking the cursor. From the Main Menu 40, the operator can select a tooling category 50 (of FIGS. 2 and 3), which can be associated with a section of a part, in the Graphics Window 46 with, for example, a mouse cursor (not shown) for training on that part. As an example of the sensory media, once the operator selects the part for training in the Graphics Window 46, in computer generated animation, that section of the structure to be tooled breaks off, rotates into an appropriate orientation, removes the skin exposing the substructure and rigs the image into the assembly fixture and reveals an Tooling Operations Submenu 60 containing tooling operations of the tooling categories 50 (of FIGS. 2 and 3) as shown in FIG. 6.

Tooling Operations Submenu

Figure 6:
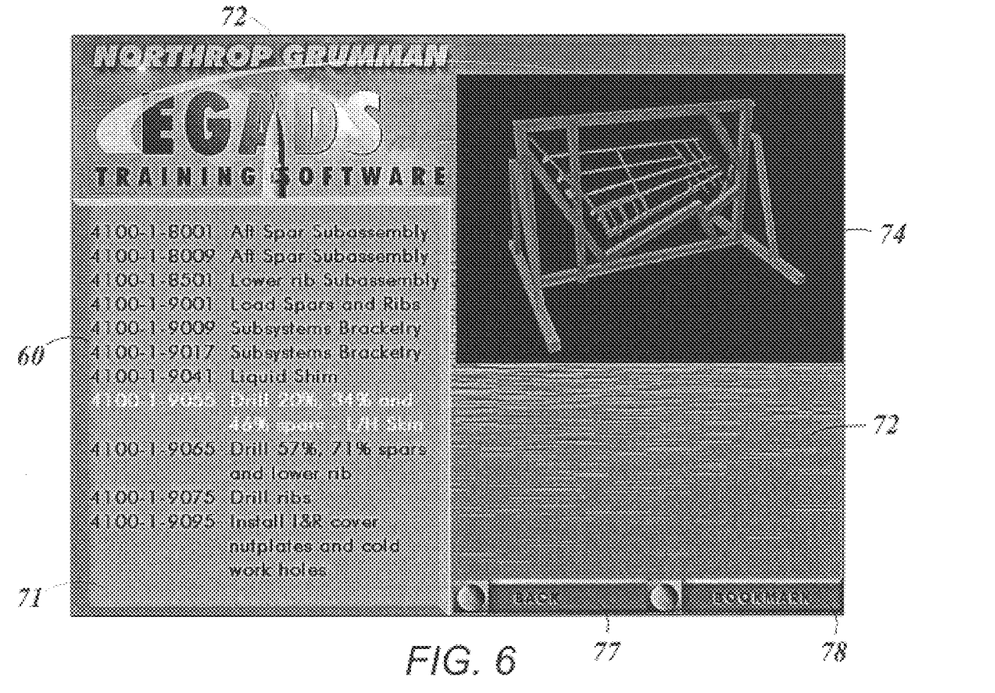
FIG. 6 illustrates the graphical user interface of the Tooling Operations Submenu.

Referring the FIGS. 2 and 3 along with FIG. 6, the Tooling Operations Submenu 60 includes a Header Window 72, a Text window 71, a Graphical Window 74 and a function tool bar with functions as shown in FIG. 6. The tool bar may have operator selectable buttons 77, 78 which allow the operator to go back to the previous screen, or to bookmark this particular display, respectively. The user selects one of the tooling operations 70 from the Text Window 71 by pointing and clicking with their cursor on the particular Tooling Operation Submenu item desired in the Text Window 71.

Figure 7:
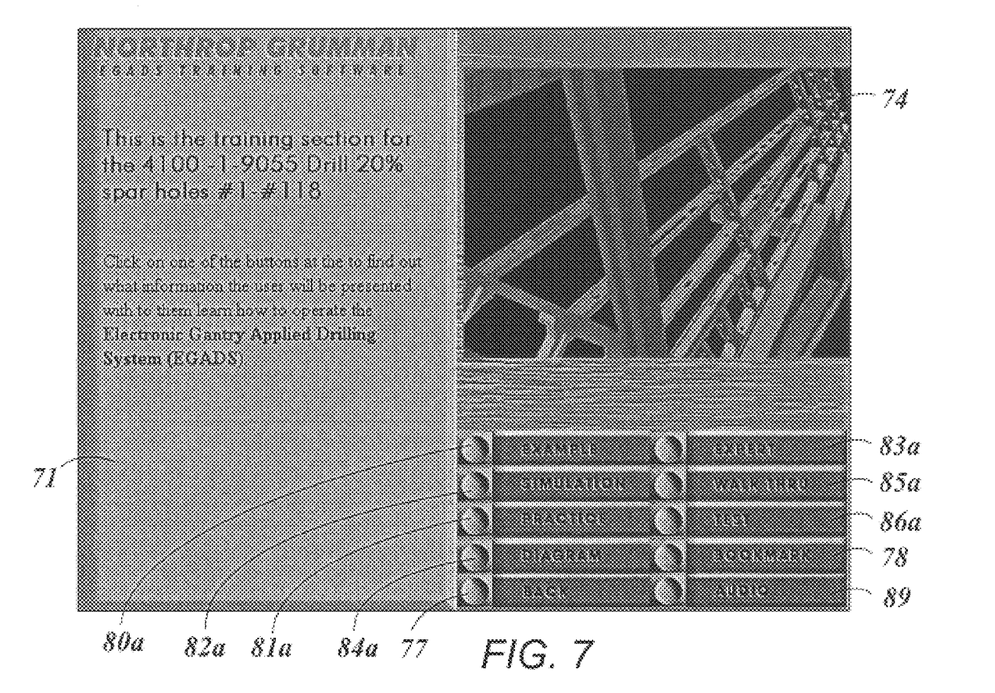
FIG. 7 illustrates the graphical user interface of the training system once a tooling operation has been selected from the Tooling Operation Submenu.

Referring the FIGS. 2 and 3 along with FIG. 7, once a Tooling Operation is selected from the Tooling Operation Submenu 60, the graphical user interface is updated to display various Functional Module buttons 80*a*, 81*a*, 82*a*, 83*a*, 84*a*, 85*a*, 86*a* which are selectable by the operator as shown in FIG. 7. These Functional Module buttons represent corresponding functional modules 80, 81, 82, 83, 84, 85, 86, of FIGS. 2 and 3 respectively. The Text Window 71 is updated with instructional text messages informing the operator for which tooling operation this training section is for and that he should click on one of the Functional Module buttons to learn how to operate the tooling device.

By using the mouse cursor and clicking on the appropriate Functional Module button 80a, 81a, 82a, 83a, 84a, 85a, 86a the user can select from the various Functional Modules 80, 81, 82, 83, 84, 85, 86, of FIGS. 2 and 3 to access an audio/textural tutorial, an activity simulation, a reference guide, line drawings, video clips of the operation, diagnostics, testing and expert advice on the tooling operation.

Additionally, the operator can perform other functions 87, such as bookmarking this screen with the bookmark button 78 and turn the audio on and off with an audio button 89. Other operator-selectable functional buttons 87 include the Back button 77 which allows the operator to go back to the previous screen. Once the operator selects one of the Functional Module buttons the display for this particular Functional Module appears. These are discussed more fully below.

Functional Modules

Various Functional Modules 80, 81, 82, 83, 84, 85, 86, of FIGS. 2 and 3 can be selected from the functional module buttons 80a, 81a, 82a, 83a, 84a, 85a, 86a, after a tooling operation 70 has been selected. These are described in detail below.

Figure 8:
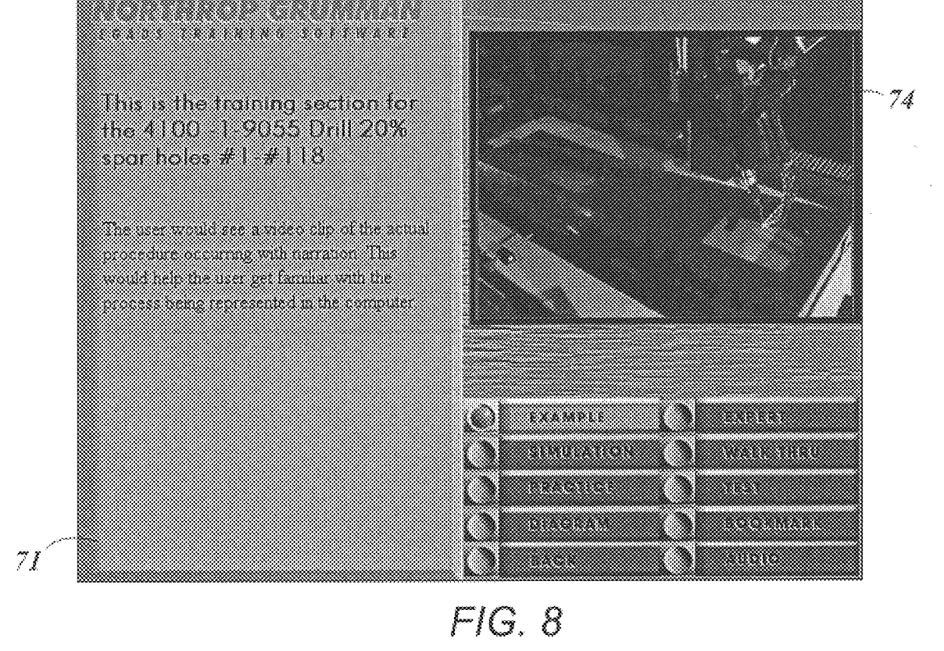
FIG. 8 illustrates the graphical user interface of the training system when the Expert Functional Module has been selected.

1. Example Functional Module: If the operator selects the Example Functional Module 80 of FIG. 2 by selecting the Example Functional Module button 80a, a video clip appears in the Graphical Window 74 as shown in FIG. 8. The video clip is accompanied by audio (if turned on), a narration of the procedure being conducted. This Example Functional Module 80 allows the user to become familiar with the tooling operation being taught. The user can toggle the audio on and off by placing and clicking his cursor on the Audio Functional Module button 89a. The user can exit the Example Functional Module 80 by either selecting (with his cursor) the Back button 88a, which takes him back to the previous screen, or by selecting another Functional Module button.

Figure 9:
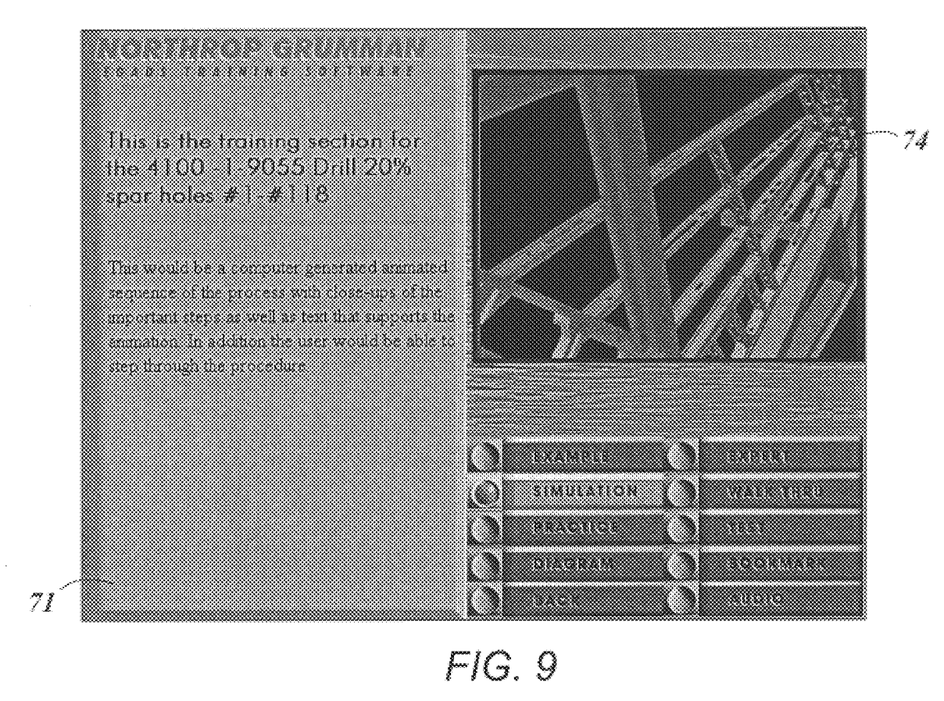
FIG. 9 illustrates the graphical user interface of the training system when the Simulation Functional Module has been selected.

2. Simulation Functional Module: If the operator selects the Simulation Functional Module 82 of FIG. 2 by moving his cursor and clicking on the Simulation Functional Module button 82a, an animation preprogrammed in memory appears in the Graphical Window 74. An exemplary scene from this animation is shown in FIG. 9. The animated sequence is preprogrammed to replicate actual steps of the process being trained. The preprogrammed-animation provides an animated sequence of the process with close-ups of the important steps. Additionally, the preprogrammed animation is accompanied by explanatory text in Text Window 71 for providing an explanation of the important features of the process as the animation proceeds, also shown in FIG. 9.

The animated sequence is preprogrammed to be operator directed. In other words, the animated sequence is stored in digital memory, allowing the operator to proceed to any point in the sequence. For example, the operator can stop an animated sequence in midstep and repeat it or repeat the entire step after it is completed. This allows the user to proceed through the procedure step by step at the operator's own pace. Audio may also accompany the simulation. The user can toggle the audio on and off by using his cursor and the Audio Functional button. The user can exit the Simulation Functional Module 82 by either selecting (with his cursor) the Back button 88a, which takes him back to the previous screen, or by selecting another Functional Module button.

Figure 10:
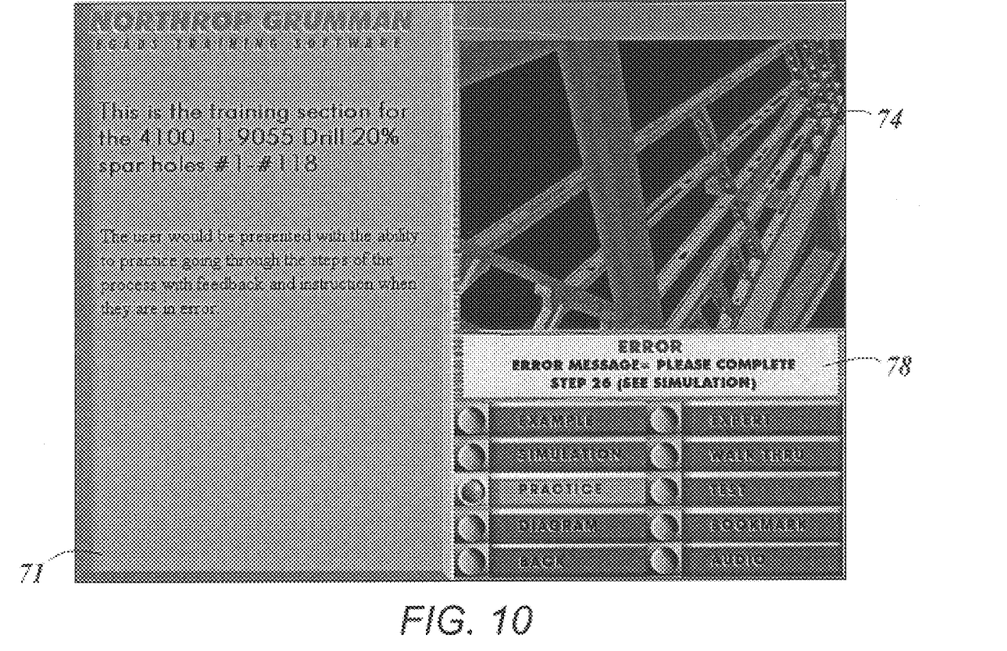
FIG. 10 illustrates the graphical user interface of the training system when the Practice Functional Module has been selected.

3. Practice Functional Module. If the operator selects the Practice Functional Module 81 of FIG. 2 by selecting the Practice Functional Module button 81a with his mouse cursor and clicking on it, a preprogrammed animation appears in the Graphical Window 74. An exemplary scene from this animation is shown in FIG. 10. The operator then is allowed to practice going through the tooling steps. For example, the operator is provided with an animated sequence of steps and is prompted to respond to preprogrammed questions and instructions on how to proceed. As the operator proceeds through the steps, feedback and instructions are provided in the Text Window 71. If the operator makes a mistake an Error Message Window 78 (as shown in FIG. 10) is displayed and can be recorded in digital memory.

In addition, a preprogrammed video or animated sequence associated with the error explaining the proper procedure may appear. The programmed sequence describes to the operator his mistake and explains, with video or animated simulation, the proper procedure. An error and progress file profiling an operator is generated for each operator as he goes through the sequence so an instructor or supervisor can evaluate the operator's progress and provide individualized personal attention if necessary. Also, a counter can be included to track each of the operator's mistakes. If such error and progress profiling is utilized then it is necessary for the operator to log in with an identifying log in name or password. Again, audio may accompany this Module to enhance the learning experience. The user can toggle the audio on and off by placing his cursor on the Audio Functional button. The user can exit the Practice Functional Module 81 by either selecting (with his cursor) the Back button 88a, which takes him back to the previous screen, or by selecting another Functional Module button.

Figure 11:
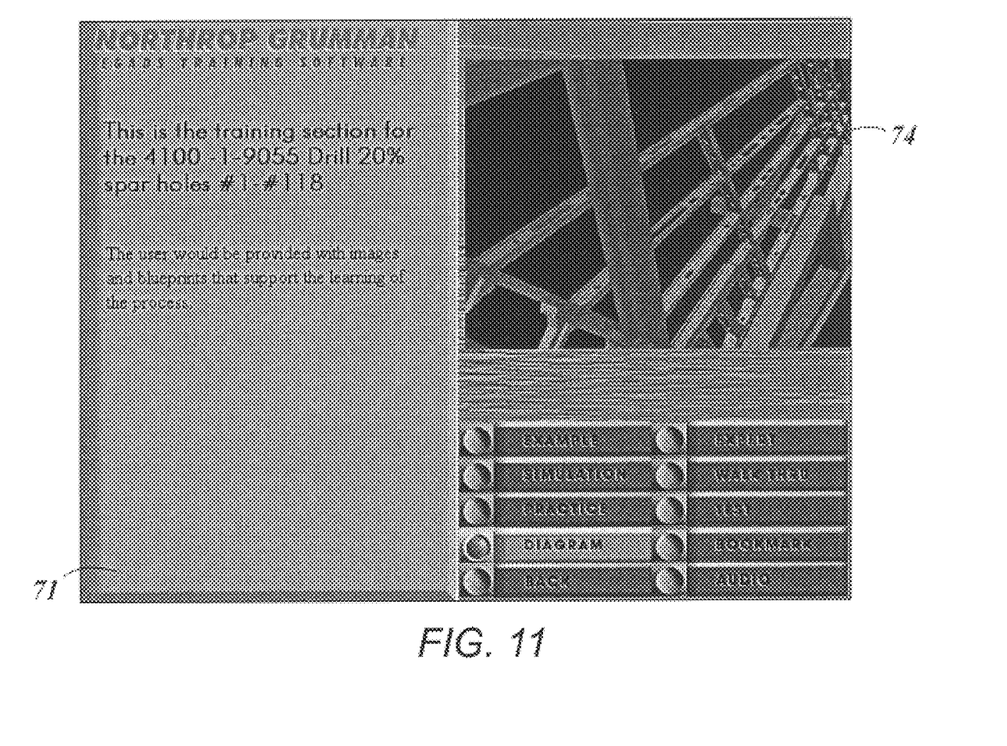
FIG. 11 illustrates the graphical user interface of the training system when the Diagram Functional Module has been selected.

4. Diagram Functional Module. If the operator selects the Diagram Functional Module 84 of FIG. 2 by selecting the Diagram Functional Module button 84a with his mouse cursor and clicking on it, blue prints and images that support the learning process are shown in the Graphical Window 74 as shown in FIG. 11. The operator can use hyperpoints or hyperlink capability to obtain a close up, more detailed view of the image in the Graphical Window 74. The Text Window 71 includes explanatory text and selectable hypertext which allows the operator to access and be directed to additional information. The user can exit the Diagram Functional Module 84 by either selecting (with his cursor) the Back button 88a, which takes him back to the previous screen, or by selecting another Functional Module button.

Figure 12:
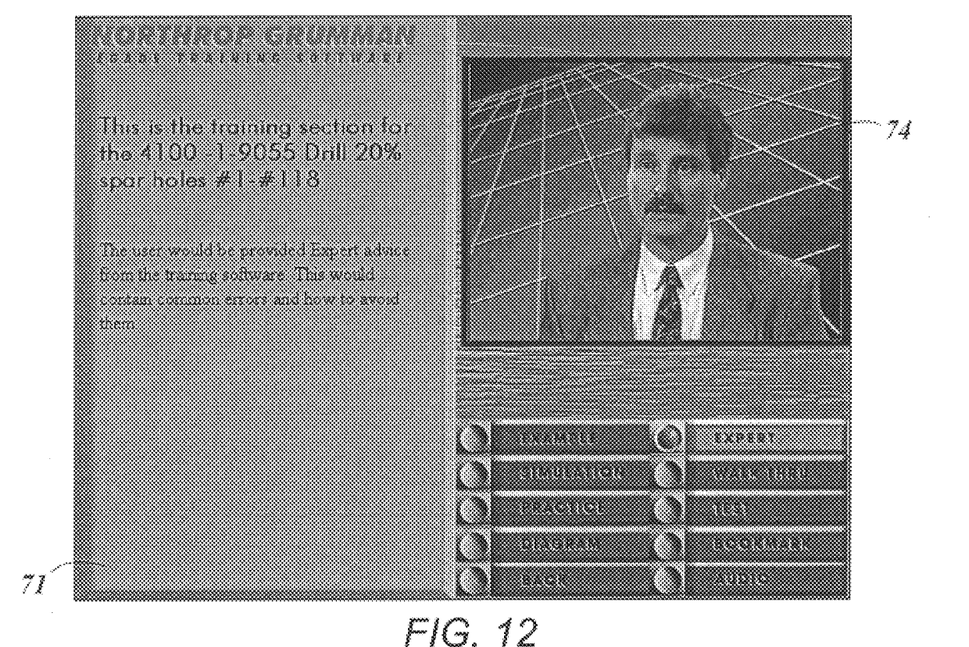
FIG. 12 illustrates the graphical user interface of the training system when the Expert Functional Module has been selected.

5. Expert Functional Module. If the operator selects the Expert Functional Module 83 of FIG. 2 by moving his cursor and clicking on the Expert Functional Module button 83a, a video appears in the Graphical Window 74 as shown in FIG. 12. This video includes advice from an expert discussing common errors in the tooling operation selected and how the user of the training system can avoid them. The user can toggle the video audio on and off by placing his cursor on the Audio Functional button 89a. The user can exit the Expert Functional Module 83 by either selecting (with his cursor) the Back button 88, which takes him back to the previous screen, or by selecting another Functional Module button.

Figure 13:
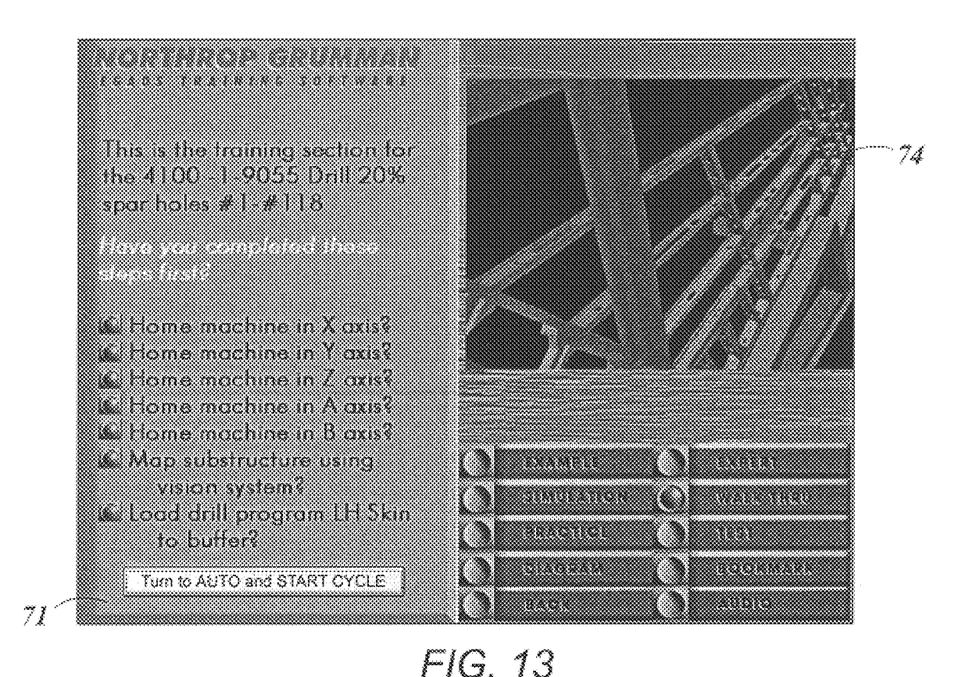
FIG. 13 illustrates the graphical user interface of the training system when the Walk Thru Functional Module has been selected.
Figure 14:
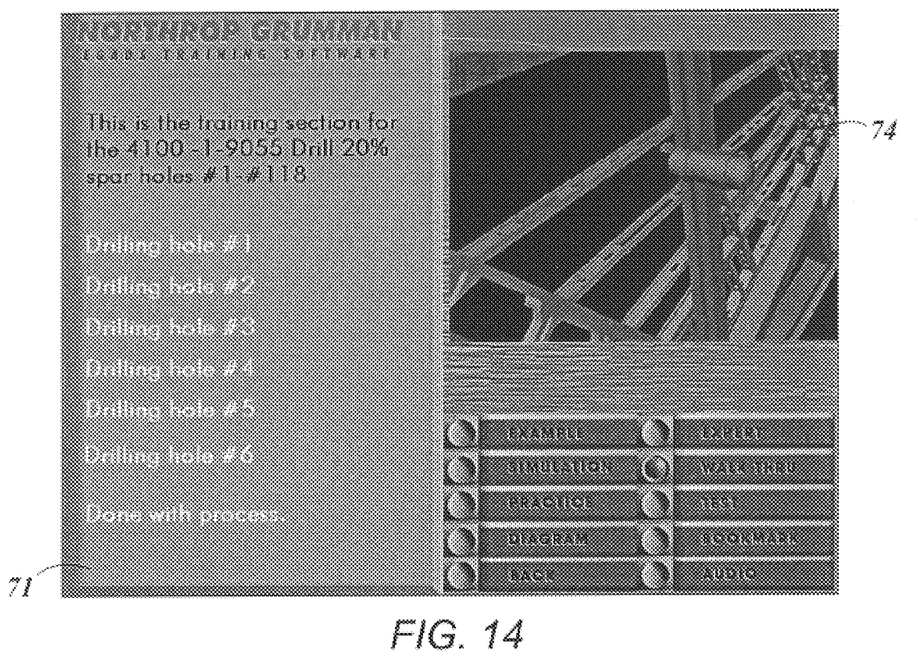
FIG. 14 illustrates the graphical user interface of the training system when the Walk Thru Functional Module has been selected.

6. Walk Thru Functional Module. If the operator selects the Walk Thru Functional Module 85 of FIG. 2 by moving his cursor and clicking on the Walk Thru Functional Module button 85*a*, the Textual Window 71 is updated to provide buttons wherein other steps of the machining process can be selected for further textual information and additional images are shown in the Graphical Window 74 as shown in FIGS. 13 and 14. The operator is walked through the sequence of operating steps by textual information provided in the Text Window 71 and a preprogrammed animation that is provided in the Graphical Window 74. The operator is allowed to cycle the displays when he has walked through the sequence of operating steps. Again, audio may accompany this Module to enhance the learning experience. The user can toggle the audio on and off by placing his cursor on the Audio Functional button. The user can exit the Walk Thru Functional Module 85 by either selecting (with his cursor) the Back button 88*a*, which takes him back to the previous screen, or by selecting another Functional Module button.

Figure 15:
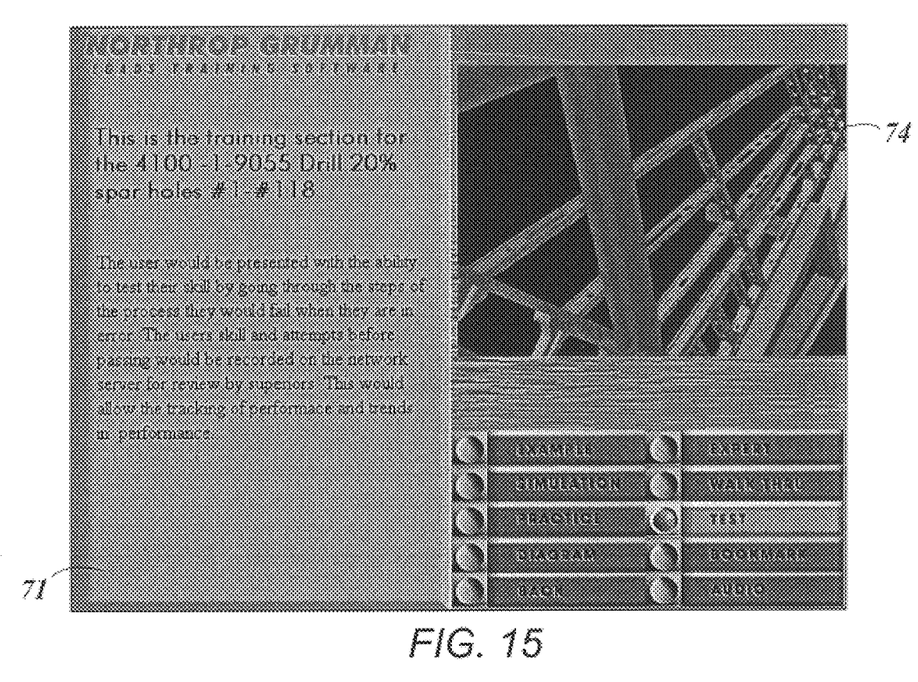
FIG. 15 illustrates the graphical user interface of the training system when the Test Functional Module has been selected.

7. Test Functional Module. If the operator selects the Test Functional Module 86 of FIG. 2 by selecting the Test Functional Module button 86*a* with his mouse cursor and clicking on it a preprogrammed animation appears in the Graphical Window 74. An exemplary scene from this animation is shown in FIG. 15. The user is allowed to test his progress and acquired skill by having a textual and preprogrammed animated test session. The user's skill and number of attempts before passing may be recorded on the computer in a data base, or possibly on a network server if the training software runs on a network, for immediate review by a superior watching from another site. Additionally, the superior can control the questions in real time during the test if desired. The use of this Test Functional Module 86 allows tracking of performance and trends in performance. The user can exit the Test Functional Module 86 by either selecting (with his cursor) the Back button 88*a*, which takes him back to the previous screen, or by selecting another Functional Module button.

8. Secondary Functions. The functions of Bookmark, Audio and Back are secondary functions which aid in the effectiveness of the training and allow the operator to navigate through the training software.

Figure 16:
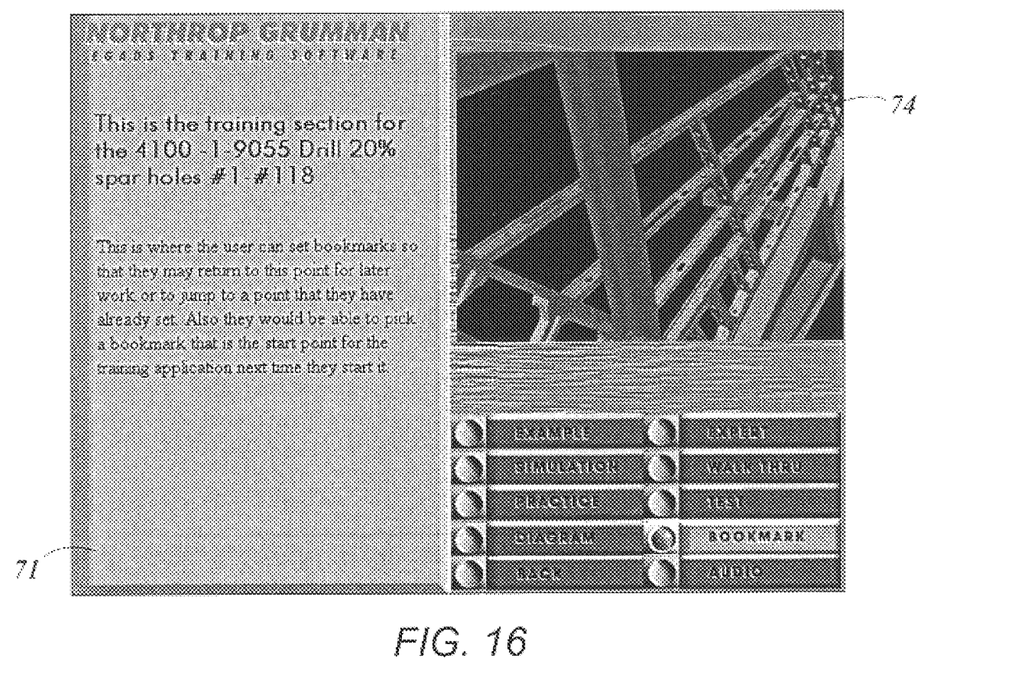
FIG. 16 illustrates the graphical user interface of the training system when the Bookmark Functional Module has been selected.

If the operator selects the Bookmark function by selecting the Bookmark Functional Module button 78 with his mouse cursor and clicking on it, the present display and place in the training system will be marked so that the user can easily return to this display or point in the training software at a later time. This display is shown in FIG. 16. This Bookmark function allows the user to jump around within the training software and to mark a point for the start point for the training application at a later date.

If the operator selects the Audio Functional Module button 89, the audio associated with the training software is toggled either on or off, depending on its present state.

If the operator selects the Back Functional Module button 77 with his cursor, the training software pages backwards.

This multi-media training system has many advantages. It serves as a quick reference guide and provides insight into the tooling process by use of simulation. It allows the user to walk through and practice the tooling operation for a particular part and gain expert advice on what common errors should be avoided. Additionally, the training system serves as a self testing device which allows the user to test their knowledge throughout the training evolution. A profile or history of each operator can be reviewed by an instructor or supervisor to aid in the training process. Alternately, the instructor or supervisor can administer a test to an operator from a remote site in real time by selecting or providing the test questions provided to the operator. An advantage of this system is that it provides direct and immediate sensory feedback to the operator for positive and negative feedback during the learning process. This training system enhances and improves the effectiveness of the learning experience by allowing the user the ability to access different instructional media. Through the integrated use of graphics, audio, video, computer animation, text, hypertext and self-test this training system is much more effective than previous training methods and tools.

The memory 7 stores information defining the machine tool 11 including data defining various geometrical aspects (such as, for example, drill bit sizes or tool sizes, tool or drill bit motion limits, drill bit offset values, workpiece jig position range), and it stores templates representing ideal machine operations, such as would be expected to be performed by an expert machine operator, including for example, drill bit spin rate (RPM), drill bit velocity (e.g., toward the workpiece) and so forth. The training software 8 can interpret such information stored in the memory 7 to give meaning to a movement by the trainee 4 of the input device 12 (which may be a trackball, for example) as corresponding to a computer-controlled repositioning of the drill bit or a computer-commanded change in the drill bit velocity, for example. The training software 8 further interprets such information from the input device 12 in light of the machine-defining information in the memory 7 and in view of a history of machine movements thus commanded by the trainee 4 to determine the present state or position of each element (e.g., the drill bit and the workpiece) of the machine tool 11 and furthermore infer from such a history the nature of the operation being performed by the trainee 4. Furthermore, the training software 8 infers the parameters of such an operation and compares them with the templates of the ideal operations stored in the memory 7 to determine how well the trainee is doing and to determine what kinds of errors he may be committing. (Such errors may include, for example, the trainee selecting such a high velocity of a drill bit through a workpiece that the drill bit or workpiece would be overheated in a real machine operation.) The training software 8 further considers all of the foregoing information to generate feedback to the trainee, such as a simulated image of the machine and workpiece illustrating in video the movements commanded by the trainee, and generating any error messages to the trainee or other helpful information of the type referred to previously in this specification. The geometric and other data stored in the memory 7 defining the machine tool 11 may be of the type required by the interface software 14 to perform actual or real computer controlled operation of the machine tool 11 (as distinguished from training simulations performed with simulated video graphics by the training software 8). Thus, the geometric and other data stored in the memory 7 for defining the machine tool 11 is a shared resource, as it is used by both the interface software 14 and the training software 8 to provide meaning to commands entered by the user (or trainee) in the form of commanded changes in the movements or operation of the machine tool 11. Both the interface software 14 and the training software 8 interpret the geometric data and machine-tool-definine data stored in the memory 7 to convert inputs from the user (via his input device 12) into commanded changes in the configuration, operation or movements of various elements of the machine tool. In the case of the training software 8, such changes are not forwarded to the machine tool 11 itself, but rather are forwarded to simulation modules of the training software which generate simulated images of the machine tool operation so as to incorporate such changes into the simulated images displayed during a training session. Furthermore, such changes are forwarded to other portions of the training software which compare the commanded machine tool movements and operation to the templates stored in the memory 7 for representing ideal or expert machine tool operations and movements. The memory may store a library of such information, data and templates for various machine tool configurations and operations (e.g., cutting, milling, lathe and so forth) so that the entire system is versatile adapts to various applications. While the invention has been described by specific reference to preferred embodiments, it is understood that variations thereof may be made without departing from the true spirit and scope of the invention.

What is claimed is:

1. A method of training a machine tool trainee to operate a computer controlled machine, while the machine is in an operational mode, the method comprising the steps of:

inputting predetermined operations data into a memory medium, the operations data being representative of the operational steps useful to properly perform a specified task;

comparing the predetermined operations data to trainee operator input data to determine whether the trainee is entering appropriate commands to perform the specified task;

disabling the trainee operation of the machine tool upon determination that the operator input data deviates from the predetermined operations data beyond a predetermined tolerance; and generating an error signal to advise the trainee that the operator input data is in error when the operator input data deviates from the predetermined operations data beyond the predetermined tolerance.

2. The method as recited in claim 1, further comprising the step of:

enabling operational control of the machine tool after the error signal has been generated, to allow the trainee to again attempt to complete the specified task without error.

3. The method as recited in claim 1, further comprising the step of:

exchanging the operator input data with a remote station such that an instructor monitors and supervises the trainee.

4. The method as recited in claim 2 wherein the trainee is inputting the operator input data with a graphical user interface.

5. The method as recited in claim 4 wherein the graphical user interface further comprises:

(1) displaying a main menu with a plurality of tooling categories, each tooling category having a primary submenu;

(2) selecting one of the plurality of tooling categories with the graphical user interface;

(3) displaying a selected primary submenu with a plurality of tooling operations with the graphical user interface, each tooling operation having a secondary submenu;

(4) selecting one of the plurality of tooling operations with the graphical user interface; and (5) displaying a selected secondary submenu with a plurality of functional modules with the graphical user interface, each functional module being associated with a tooling task, wherein the functional module is accompanied by sensory media of at least one of video, audio, graphics, preprogrammed animation and text for immediate sensory feedback.

6. The method of claim 5 wherein step (1) further comprises:

displaying a text window for inputting textual information and operator selectable hypertext and a graphical window for inputting graphical information and operator selectable hypergraphics.

7. The method of claim 5 wherein step (5) further comprises:

displaying an operator selectable simulation functional module for viewing a preprogrammed animated sequence of steps replicating said tooling task.

8. The method of claim 5 wherein step (5) further comprises:

displaying an operator selectable example functional module for viewing a preprogrammed video sequence of steps replicating said tooling task.

9. The method of claim 5 wherein step (5) further comprises:

displaying an operator selectable practice functional module for allowing said operator to input and to perform preprogrammed practice simulation steps of said tooling task.

10. The method of claim 5 wherein step (5) further comprises:

displaying an operator selectable error functional modules prompted by preprogrammed events associated with operator error input.

11. The method of claim 5 wherein step (5) further comprises:

displaying an operator selectable walk-through functional module for allowing said operator to examine a preprogrammed sequential simulation of said tooling task.

12. The method of claim 5 wherein step (5) further comprises:

displaying an operator selectable expert functional module for viewing a preprogrammed interactive session of frequently asked questions with text and hypertext to additional information of said tooling task.

13. The method of claim 5 wherein step (5) further comprises:

displaying an operator selectable self-test functional module for allowing said operator to view a preprogrammed interactive testing session of said tooling task.

14. The method of claim 5 wherein step (5) further comprises:

displaying an operator selectable diagram functional module for allowing said operator to view preprogrammed blue prints and images that support learning process of said tooling task.

15. A machine tool training system for a machine tool trainee, comprising:

a machine tool; and a computer interfaced to said machine tool and having:

training software operative to compare predetermined operations data with operator input data to determine whether the trainee is entering appropriate commands to perform the specified task;

wherein the training software disables operation of the machine tool upon determination that the operator input data deviates from the predetermined operations data beyond a predetermined tolerance, thereby generating an error signal to the trainee to advise the trainee that the operator input data is in error; and interface software configured to operate the machine tool;

wherein the interface software moves and operates the machine tool solely upon the operator input data being inputted by the trainee.

16. The system of claim 15 wherein the computer further has a memory medium operative to share access to and exchange operator input data with the training software in the computer.

17. The system of claim 16 wherein the memory medium is operative to share access to and exchange operator input data with the interface software in the computer.

18. The system of claim 17 wherein the training software in the computer further comprises a graphical user interface.

19. The system of claim 18 wherein the graphical user interface of the training software further comprises:

a main menu with a plurality of primary training submenus, each primary submenu is associated with a tooling category;

a selected primary submenu with a plurality of secondary training submenus, each secondary submenu is associated with a tooling operation; and a selected secondary submenu with a plurality of functional modules, each functional module is associated with a tooling task, wherein the functional module is accompanied by sensory media of at least one of video, audio, graphics, preprogrammed animation and text for immediate sensory feedback.

20. The system of claim 18 wherein the training software includes training modules, wherein the training modules consist of menu control buttons, integrated windows, and icons.

21. The system of claim 20 further comprising a remote station for an instructor interfaced to the computer and operative to share access to and exchange the operator data with the memory medium.

22. The system of claim 20 wherein said graphical user interface further comprises an operator selectable practice functional module for allowing said operator to input and perform preprogrammed practice simulation steps of said tooling task.

23. The system of claim 20 wherein said graphical user interface further comprises an operator selectable error functional module prompted by preprogrammed events associated with operator error input.

24. The system of claim 20 wherein said graphical user interface further comprises an operator selectable walk-through functional module for allowing said operator to examine a preprogrammed sequential simulation of said tooling task.

25. The system of claim 20 wherein said graphical user interface further comprises an operator selectable expert functional module for viewing a preprogrammed interactive session of frequently asked questions with text and hypertext to additional information of said tooling task.

26. The system of claim 20 wherein said graphical user interface further comprises an operator selectable self-test functional module for allowing said operator to view a preprogrammed interactive testing session of said tooling task.

27. The system of claim 20 wherein said graphical user interface further comprises an operator selectable example functional module for allowing said operator to view a preprogrammed video clip of said tooling task.

28. The system of claim 20 wherein said graphical user interface further comprises an operator selectable diagram functional module for allowing said operator to view preprogrammed blue prints and images that support learning process of said tooling task.

29. The system of claim 20 wherein said graphical user interface further comprises an operator selectable simulation functional module for allowing said operator to view a preprogrammed animated sequence of steps of said tooling task.

* * * * *